United States Patent
Renggli

(10) Patent No.: US 10,316,695 B2
(45) Date of Patent: Jun. 11, 2019

(54) METALLIC ATTACHMENT SYSTEM INTEGRATED INTO A COMPOSITE STRUCTURE

(71) Applicant: General Electric Company, Schenectady, NY (US)

(72) Inventor: Bernard James Renggli, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 569 days.

(21) Appl. No.: 14/964,752

(22) Filed: Dec. 10, 2015

(65) Prior Publication Data
US 2017/0167296 A1    Jun. 15, 2017

(51) Int. Cl.
  *F01D 25/26*   (2006.01)
  *F01D 25/00*   (2006.01)
  (Continued)

(52) U.S. Cl.
  CPC .............. *F01D 25/26* (2013.01); *B32B 3/06* (2013.01); *B32B 3/266* (2013.01); *B32B 5/26* (2013.01); *C04B 35/80* (2013.01); *F01D 25/005* (2013.01); *F01D 25/243* (2013.01); *F01D 25/28* (2013.01); *F02K 1/04* (2013.01); *F02K 1/80* (2013.01); *B32B 2260/023* (2013.01);
  (Continued)

(58) Field of Classification Search
  CPC .......... F02K 1/04; F02K 1/80; Y10T 403/645; F01D 25/243; F01D 25/26; F05D 2330/642; F05D 2260/31; F05D 25/005; F05D 25/28; F05D 2230/60; Y02T 50/672; F16B 2200/506
  See application file for complete search history.

(56) References Cited

U.S. PATENT DOCUMENTS

| 2,943,661 A | 7/1960 | Stern |
| 3,194,292 A | 7/1965 | Borowsky |
| (Continued) |

FOREIGN PATENT DOCUMENTS

| CN | 1570365 A | 1/2005 |
| CN | 101082345 A | 12/2007 |
| (Continued) |

OTHER PUBLICATIONS

Extended European Search Report and Opinion issued in connection with corresponding EP Application No. 16202274.3 dated Apr. 10, 2017.
(Continued)

*Primary Examiner* — Matthew R McMahon
(74) *Attorney, Agent, or Firm* — Dority & Manning, P.A.

(57) ABSTRACT

The present disclosure is directed to a composite component defining a component aperture extending between a first surface and a second surface. The composite component includes an insert having an insert annular wall positioned in the component aperture. The insert annular wall defines an insert aperture therethrough. An insert flange extends radially outwardly from the insert annular wall and contacts the first surface of the composite component. The insert flange includes a diameter about 1.5 times to about 5 times greater than a smallest diameter of the component aperture defined by the composite component.

19 Claims, 5 Drawing Sheets

(51) Int. Cl.
*F01D 25/24* (2006.01)
*F02K 1/04* (2006.01)
*F02K 1/80* (2006.01)
*B32B 3/06* (2006.01)
*B32B 3/26* (2006.01)
*B32B 5/26* (2006.01)
*F01D 25/28* (2006.01)
*C04B 35/80* (2006.01)

(52) U.S. Cl.
CPC ... *B32B 2260/046* (2013.01); *B32B 2262/105* (2013.01); *B32B 2605/18* (2013.01); *C04B 2235/48* (2013.01); *C04B 2235/616* (2013.01); *F05D 2230/22* (2013.01); *F05D 2230/31* (2013.01); *F05D 2230/60* (2013.01); *F05D 2260/31* (2013.01); *F05D 2300/175* (2013.01); *F05D 2300/603* (2013.01); *F05D 2300/6033* (2013.01); *F16B 2200/506* (2018.08); *Y02T 50/672* (2013.01)

(56) References Cited

U.S. PATENT DOCUMENTS

| | | | |
|---|---|---|---|
| 3,666,910 A | 5/1972 | Anderson | |
| 4,874,318 A | 10/1989 | Spencer | |
| 4,936,065 A | 6/1990 | Hutchinson | |
| 5,139,302 A | 8/1992 | Kanke | |
| 5,147,430 A | 9/1992 | Kidd | |
| 5,256,017 A | 10/1993 | Smirnov et al. | |
| 5,275,529 A * | 1/1994 | Langenbrunner | F02C 7/045 244/132 |
| 5,476,702 A | 12/1995 | Datta et al. | |
| 5,531,731 A | 7/1996 | Brusky | |
| 5,540,621 A | 7/1996 | Keester et al. | |
| 5,561,325 A | 10/1996 | Ueno et al. | |
| 5,592,814 A * | 1/1997 | Palusis | F02K 1/80 60/753 |
| 5,664,820 A | 9/1997 | Carmien | |
| 5,702,149 A | 12/1997 | Sweeney | |
| 5,709,516 A | 1/1998 | Peterson et al. | |
| 5,800,371 A | 9/1998 | Winn | |
| 5,996,190 A | 12/1999 | Peterson | |
| 6,045,310 A | 4/2000 | Miller et al. | |
| 6,247,256 B1 | 6/2001 | Simson et al. | |
| 6,273,805 B1 | 8/2001 | Sunagawa | |
| 6,393,610 B1 | 5/2002 | Parks | |
| 6,805,486 B2 | 10/2004 | Smith et al. | |
| 6,842,950 B2 | 1/2005 | Fleuchaus et al. | |
| 7,087,296 B2 | 8/2006 | Porter | |
| 7,624,910 B2 | 12/2009 | Barnes et al. | |
| 7,722,317 B2 * | 5/2010 | Schiavo | F01D 25/246 266/285 |
| 7,878,747 B2 | 2/2011 | Dean et al. | |
| 8,061,977 B2 | 11/2011 | Keller et al. | |
| 8,142,124 B2 | 3/2012 | Kulesha | |
| 8,617,339 B2 | 12/2013 | Desroisers et al. | |
| 8,943,750 B2 | 2/2015 | Twork, Jr. | |
| 9,133,723 B2 * | 9/2015 | Vo | F01D 9/04 |
| 9,732,701 B2 * | 8/2017 | Lu | F02K 1/80 |
| 9,784,215 B2 * | 10/2017 | Lu | F02K 1/80 |
| 2002/0165517 A1 | 11/2002 | Datta et al. | |
| 2007/0051069 A1 | 3/2007 | Grimes | |
| 2009/0126168 A1 | 5/2009 | Kobe et al. | |
| 2010/0036324 A1 | 2/2010 | Smith et al. | |
| 2010/0263194 A1 * | 10/2010 | Morrison | F16B 5/0266 29/525.04 |
| 2012/0296578 A1 | 11/2012 | Redin | |
| 2013/0202450 A1 * | 8/2013 | Ivakitch | F16D 1/076 416/248 |
| 2014/0003880 A1 | 1/2014 | Grooms, II | |
| 2014/0248146 A1 * | 9/2014 | Sander | F02C 7/20 415/213.1 |
| 2014/0360053 A1 | 12/2014 | Morris | |
| 2015/0226083 A1 * | 8/2015 | Renggli | F02C 7/20 60/796 |
| 2015/0322890 A1 * | 11/2015 | Lu | F02K 1/80 60/770 |
| 2015/0354412 A1 * | 12/2015 | Preston | F01D 25/28 60/796 |
| 2016/0131083 A1 * | 5/2016 | Lu | F01D 25/243 239/265.11 |
| 2016/0177786 A1 * | 6/2016 | Sippel | F01D 25/24 416/189 |
| 2016/0326911 A1 * | 11/2016 | Karafillis | F01D 25/28 |

FOREIGN PATENT DOCUMENTS

| | | |
|---|---|---|
| EP | 0027107 B1 | 7/1986 |
| EP | 1 316 420 A1 | 6/2003 |
| EP | 1 712 803 A1 | 10/2006 |
| EP | 1 235 987 B1 | 4/2009 |
| EP | 2 574 894 A3 | 4/2013 |
| EP | 2 703 654 A1 | 3/2014 |
| EP | 2 944 776 A1 | 11/2015 |
| JP | 2015-51663 A | 3/2015 |
| WO | WO 88/07808 | 10/1988 |
| WO | WO 94/01636 | 1/1994 |
| WO | WO 00/45003 | 8/2000 |
| WO | WO 01/42668 A1 | 6/2001 |
| WO | WO 02/069867 A1 | 9/2002 |
| WO | WO 2009/064711 A2 | 5/2009 |
| WO | WO 2012/147823 A1 | 11/2012 |
| WO | WO 2012/156680 A1 | 11/2012 |
| WO | 2014/022344 A1 | 2/2014 |
| WO | WO 2014/058502 A2 | 4/2014 |

OTHER PUBLICATIONS

First Office Action and Search issued in connection with corresponding CN Application No. 201611129056.2 dated Apr. 26, 2018.

* cited by examiner

METALLIC ATTACHMENT SYSTEM INTEGRATED INTO A COMPOSITE STRUCTURE

FIELD OF THE INVENTION

The present subject matter relates generally to a gas turbine engine and, more particularly, to an attachment assembly for a gas turbine engine.

BACKGROUND OF THE INVENTION

Gas turbine engines typically include a compressor section, a combustor section, a turbine section, and an exhaust section. A rotor shaft rotatably couples the compressor section and the turbine section. In this respect, the compressor section compresses air entering the gas turbine engine. This compressed air mixes with fuel in the combustor section to form an air and fuel mixture, which produces hot exhaust gases when ignited. These hot exhaust gases then flow through the turbine section, which extracts kinetic energy therefrom. This, in turn, rotates the rotor shaft, which provides the necessary mechanical energy to the compressor section to compress the incoming air. After flowing through the turbine section, the hot exhaust gases exit the gas turbine engine via the exhaust section.

In particular configurations, the exhaust section may include a center body that couples to a rear frame of the turbine section. The components defining the hot gas path, such as the center body, may be constructed of a ceramic matrix composite ("CMC") material or another composite material capable of withstanding prolonged exposure to the hot combustion gases. The components positioned radially inward or radially outward from the hot gas path, such as the rear frame of the turbine section, typically experience lower temperatures than the components along the hot gas path. In this respect, these components may be constructed from suitable metallic materials.

Conventional attachment systems typically used in gas turbine engines to couple a composite component (e.g., the CMC center body) to another component (e.g., the metallic rear frame of the turbine section) require machining of the composite component. This is a time-consuming and expensive process that results in increased manufacturing time and cost when constructing the gas turbine. Accordingly, an attachment assembly for coupling a composite gas turbine engine component to another gas turbine component that eliminates the need for machining of the composite component would be welcomed technology.

BRIEF DESCRIPTION OF THE INVENTION

Aspects and advantages of the invention will be set forth in part in the following description, or may be obvious from the description, or may be learned through practice of the invention.

The attachment assembly disclosed herein eliminates the need for machining a composite gas turbine component when coupling the composite gas turbine component to another gas turbine component. In this respect, the attachment assembly disclosed herein reduces manufacturing time and cost compared to conventional attachment assemblies.

In one aspect, the present disclosure is directed to a composite component defining a component aperture extending between a first surface and a second surface. The composite component includes an insert having an insert annular wall positioned in the component aperture. The insert annular wall defines an insert aperture therethrough. An insert flange extends radially outwardly from the insert annular wall and contacts the first surface of the composite component. The insert flange includes a diameter about 1.5 times to about 5 times greater than a smallest diameter of the component aperture defined by the composite component.

In another aspect, the present disclosure is directed to an attachment assembly for gas turbine. The attachment assembly includes a first component defining a first aperture and a second component at least partially overlapping the first component. The second component includes a first surface and a second surface and defines a second aperture extending between the first surface and the second surface. An insert includes an insert annular wall positioned in the second aperture of the second component and an insert flange extending radially outwardly from the insert annular wall. The insert flange is adjacent to the first surface of the second component, and the insert annular wall defines an insert aperture therethrough. A bushing includes a bushing annular wall positioned in the second aperture of the second component and a bushing flange extending radially outwardly from the bushing annular wall, which defines a bushing aperture therethrough. A spring washer is positioned between the second surface of the second component and the bushing flange. A fastener couples the first component and the second component such that the first aperture, the insert aperture, the bushing aperture, and the second aperture receive the fastener.

A further aspect of the present disclosure is directed to a method of forming a composite component. The method includes layering a plurality of resin-impregnated plies over an insert flange of an insert to form a composite component. The composite component and insert are co-cured. The composite component, once cured, defines an aperture in which an insert annular wall is positioned and a cavity disposed circumferentially around the aperture in which an insert flange is received.

These and other features, aspects and advantages of the present invention will be better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
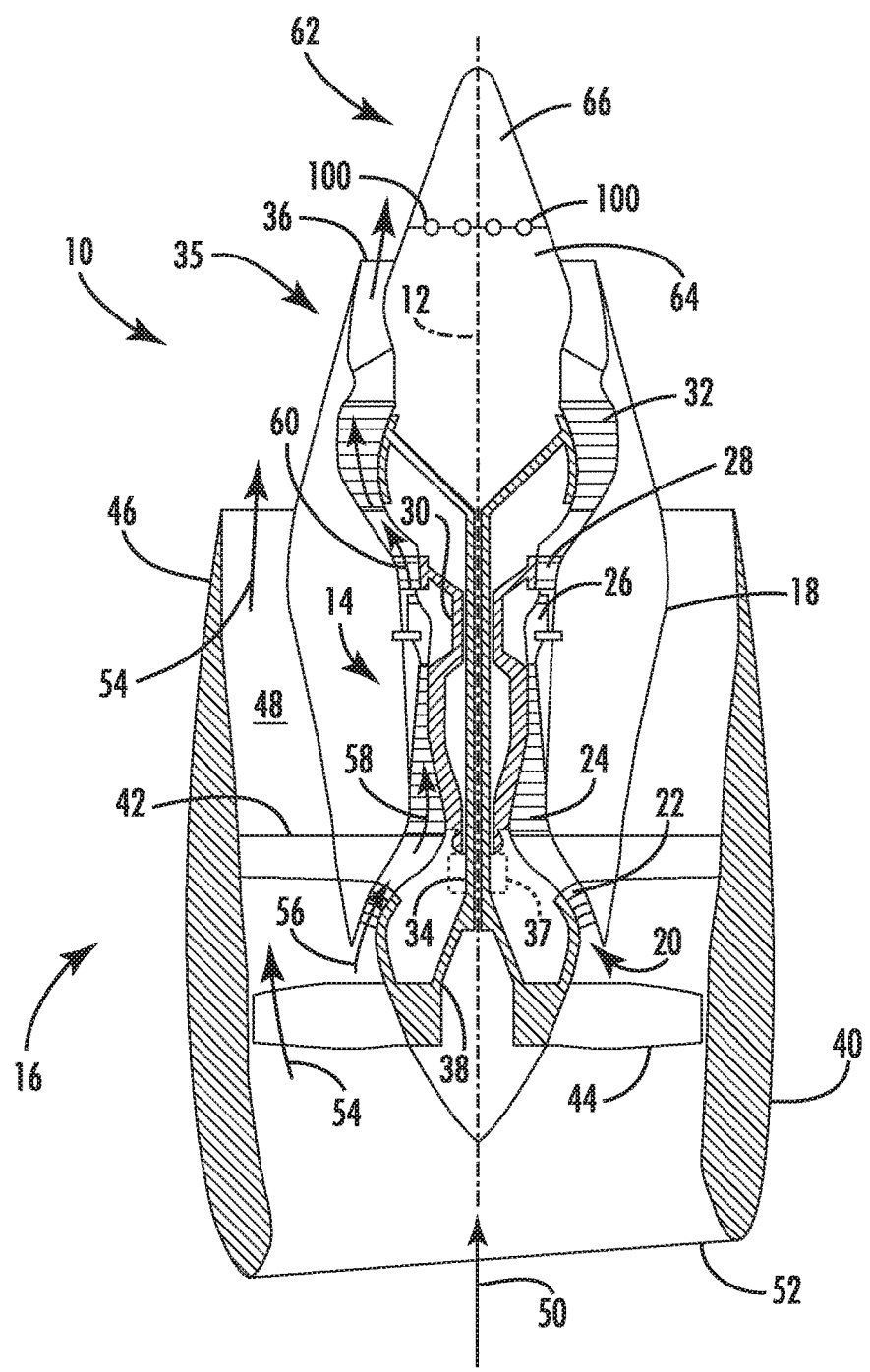
FIG. 1 is a cross-sectional view of one embodiment of a turbofan engine for use in an aircraft in accordance with the embodiments disclosed herein.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

Referring now to the drawings, FIG. 1 illustrates a cross-sectional view of one embodiment of a turbofan gas turbine engine 10 ("turbofan 10") for use in an aircraft in accordance with the embodiments disclosed herein. The turbofan 10 includes a longitudinal or axial centerline axis 12 extending therethrough for reference purposes.

In general, the turbofan 10 may include a core gas turbine engine 14 and a fan section 16 positioned upstream thereof. The core engine 14 may generally include a substantially tubular outer casing 18 that defines an annular inlet 20. In addition, the outer casing 18 may further enclose and support a low pressure compressor section 22 for increasing the pressure of the air that enters the core engine 14 to a first pressure level. A high pressure, multi-stage, axial-flow compressor section 24 may then receive the pressurized air from the low pressure compressor section 22 and further increase the pressure of such air. The pressurized air exiting the high-pressure compressor section 24 may then flow to a combustor 26 within which fuel is injected into the flow of pressurized air, with the resulting mixture being combusted within the combustor 26. The high energy combustion products are directed from the combustor 26 along the hot gas path of the turbofan 10 to a high pressure turbine section 28 for driving the high pressure compressor section 24 via a high pressure shaft 30, and then to a low pressure turbine section 32 for driving the low pressure compressor section 22 and fan section 16 via a low pressure shaft 34 generally coaxial with high pressure shaft 30. After driving each of turbine sections 28 and 32, the combustion products may be expelled from the core engine 14 via an exhaust section 35 to provide propulsive jet thrust.

Additionally, as shown in FIG. 1, the fan section 16 of the turbofan 10 may generally include a rotatable, axial-flow fan rotor assembly 38 surrounded by an annular fan casing 40. It should be appreciated by those of ordinary skill in the art that the fan casing 40 may be supported relative to the core engine 14 by a plurality of substantially radially-extending, circumferentially-spaced outlet guide vanes 42. As such, the fan casing 40 may enclose the fan rotor assembly 38 and its corresponding fan rotor blades 44. Moreover, a downstream section 46 of the fan casing 40 may extend over an outer portion of the core engine 14 so as to define a secondary, or by-pass, airflow conduit 48 providing additional propulsive jet thrust.

In several embodiments, the low pressure shaft 34 may be directly coupled to the fan rotor assembly 38 to provide a direct-drive configuration. Alternatively, the low pressure shaft 34 may be coupled to the fan rotor assembly 38 via a speed reduction device 37 (e.g., a reduction gear or gearbox) to provide an indirect-drive or geared drive configuration. Such a speed reduction device(s) may also be provided between any other suitable shafts and/or spools within the engine as desired or required.

Figure 2:
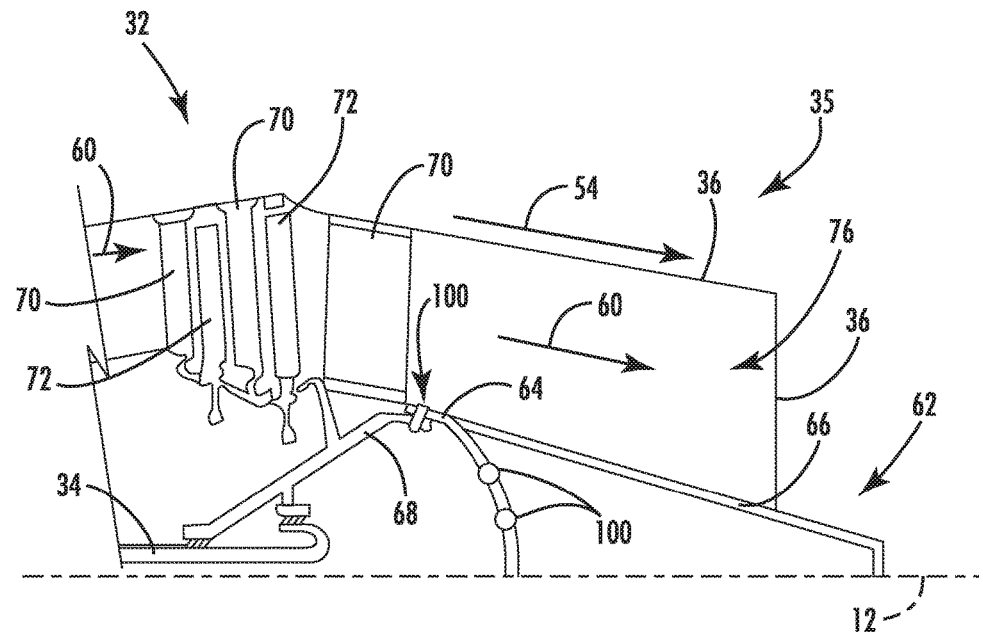
FIG. 2 is a schematic side view of a low pressure turbine section and an exhaust section of the turbofan engine as shown in FIG. 1, as may incorporate various embodiments disclosed herein.

FIG. 2 is a schematic view of the low pressure turbine section 32 and the exhaust section 35. More specifically, the low pressure turbine section 32 includes a plurality of stator vanes 70 and a plurality of turbine blades 72. Although FIG. 2 shows three stator vanes 70 and two turbine blades 72, the low pressure turbine section 32 may include more or less stator vanes 70 and more or less turbine blades 72 as is needed or desired. As the combustion products 60 flow through the low pressure turbine 32, the stator vanes 70 direct the combustion products 60 onto the turbine blades 72. The turbine blades 72 extract kinetic energy from the combustion products 60, thereby rotating the low pressure shaft 34.

After flowing through the low pressure turbine 32, the combustion products exit the turbofan 10 through the exhaust section 35 as mentioned above. The exhaust section 35 may include a center body 62 and an exhaust nozzle 36 positioned circumferentially around and radially spaced apart from the center body 62. In this respect, the center body 62 and the exhaust nozzle 36 define an annular exhaust conduit 76 through which the combustion products 60 flow. In some embodiments, the center body 62 may include a forward center body 64 and an aft center body 66, which may be coupled via one or more attachment assemblies 100. Preferably, the center body 62 has a generally conical shape; although, the center body 62 may be any suitable shape.

The aft center body 66 or the center body 62 (if the center body 62 is a single piece) may couple to a turbine rear frame 68 via one or more attachment assemblies 100. The turbine rear frame 68 provides structural support for some of the components (e.g., the stator vanes 70) of the low pressure turbine 32. In this respect, the turbine rear frame 68 also supports the center body 62. Nevertheless, however, the center body 62 may connect to other portions of the turbofan 10.

Referring again to FIG. 1, during operation of the turbofan 10, it should be appreciated that an initial air flow (indicated by arrow 50) may enter the turbofan 10 through an associated inlet 52 of the fan casing 40. The air flow 50 then passes through the fan blades 44 and splits into a first compressed air flow (indicated by arrow 54), which flows through conduit 48, and a second compressed air flow (indicated by arrow 56), which enters the low pressure compressor section 22. The pressure of the second compressed air flow 56 is then increased and enters the high pressure compressor section 24 (as indicated by arrow 58). After mixing with fuel and being combusted within the combustor 26, combustion products 60 exit the combustor 26 and flow through the high pressure turbine section 28. Thereafter, the combustion products 60 flow through the low pressure turbine section 32 and exit the exhaust nozzle 36 to provide thrust for the engine 10.

Along with a turbofan 10, a core turbine 14 serves a similar purpose and sees a similar environment in land-based gas turbines, turbojet engines in which the ratio of the first portion of air 54 to the second portion of air 56 is less than that of a turbofan, and unducted fan engines in which the fan section 16 is devoid of the annular fan casing 40.

Figure 3:
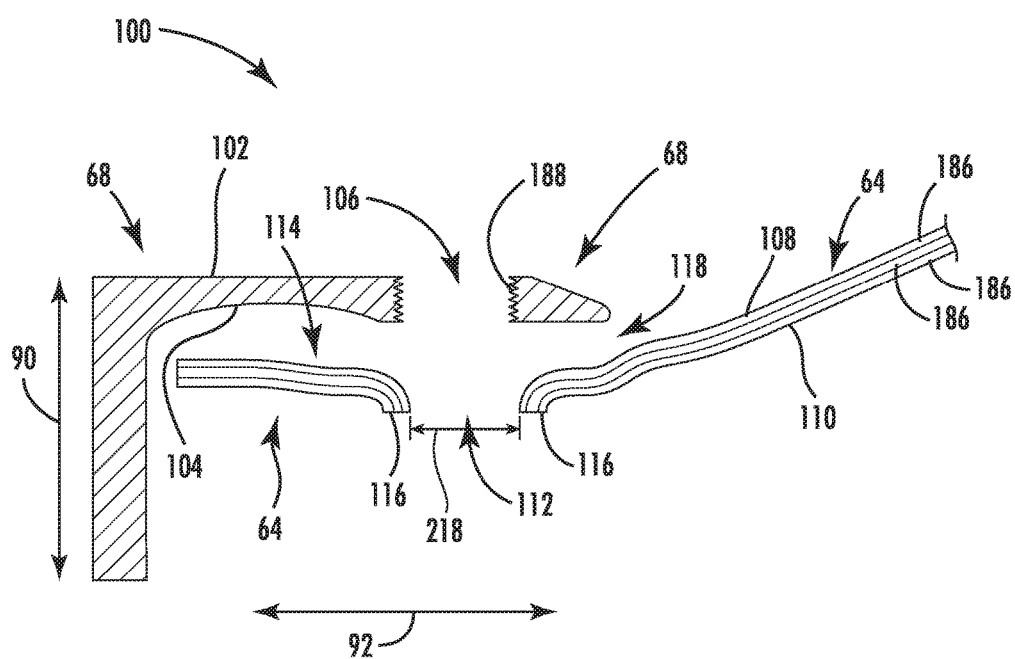
FIG. 3 is a cross-sectional side view of a turbine rear frame and a forward center body, illustrating the alignment of a turbine rear frame aperture and a forward center body aperture for receiving one embodiment of an attachment assembly disclosed herein.
Figure 4:
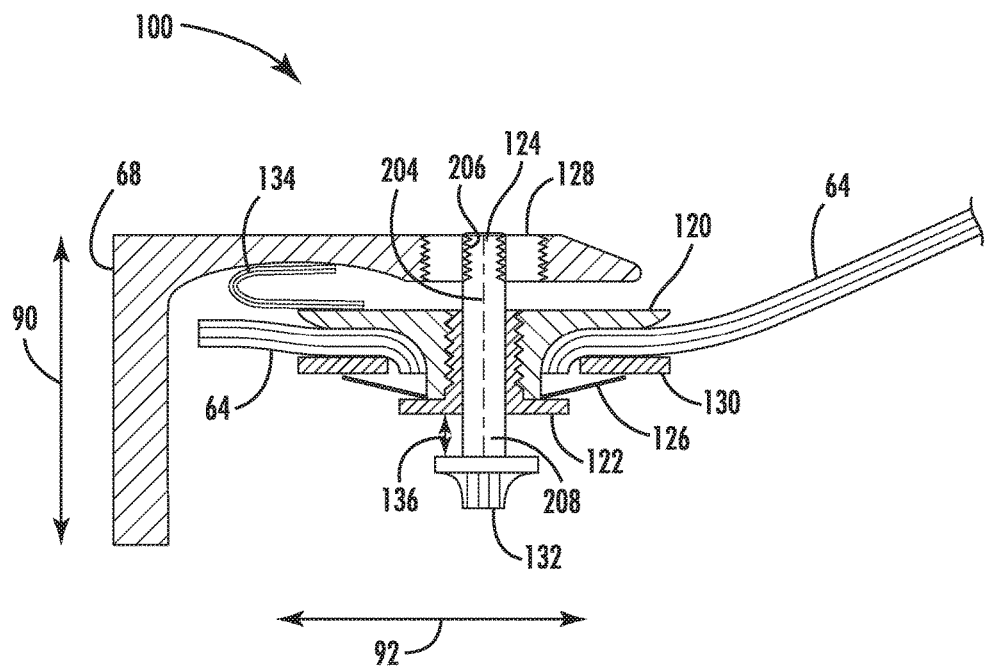
FIG. 4 is a cross-sectional view of one embodiment of the attachment assembly, illustrating an insert and a bushing.
Figure 5:
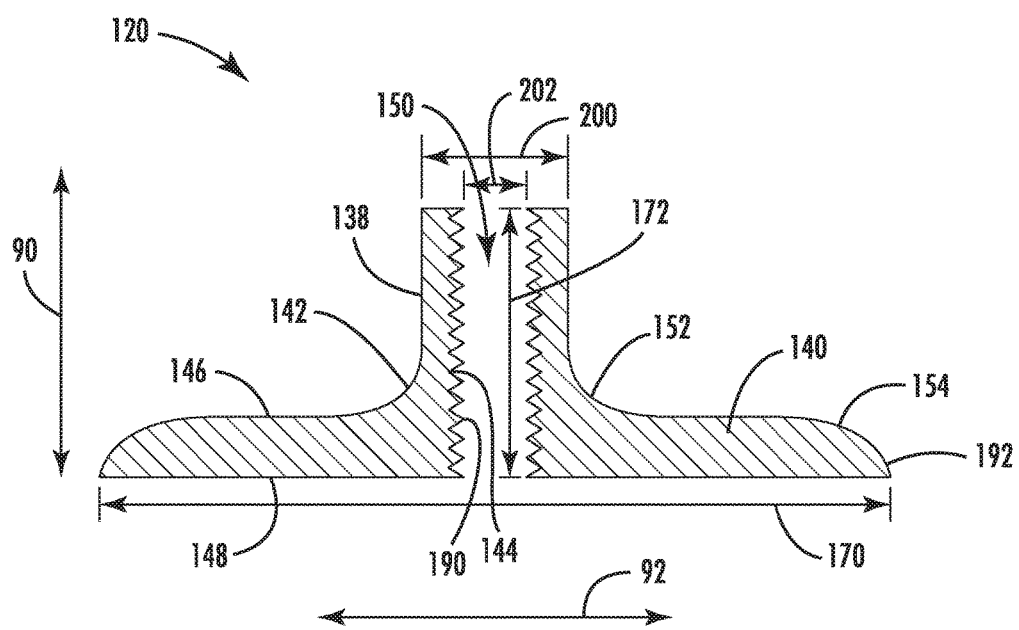
FIG. 5 is a cross-section view of one embodiment of the insert, illustrating an insert annular wall, an insert flange, and an insert aperture.
Figure 6:
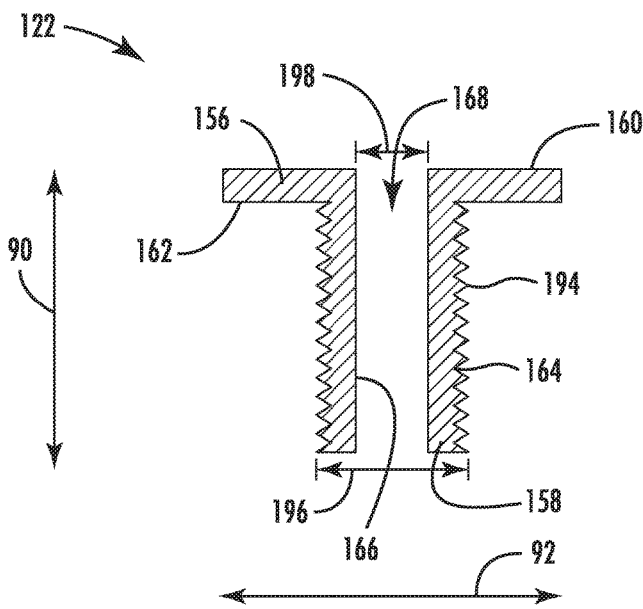
FIG. 6 is a cross-section view of one embodiment of the bushing, illustrating a bushing annular wall, a bushing flange, and a bushing aperture.

FIGS. 3-6 illustrate one embodiment of the attachment assembly 100. More specifically, FIG. 3 illustrates the alignment of a turbine rear frame aperture 106 with a forward center body aperture 112, which permits receipt of the attachment assembly 100. FIG. 4 illustrates the attachment assembly 100 coupling the turbine rear frame 68 and the forward center body 64. FIG. 5 illustrates an insert 120 of the attachment assembly 100, and FIG. 6 illustrates a bushing 122 of the attachment assembly 100.

As illustrated in FIGS. 3-8, the attachment assembly 100 defines an axial direction 90 and a radial direction 92.

The attachment assembly 100 secures a first component, such as the turbine rear frame 68 of the turbofan 10, to a second component, such as the forward center body 64 of the turbofan 10. In some embodiments, the first and the second components may be gas turbine walls. Although, the first and second components may be any other adjacent components in the turbofan 10. In some embodiments, the forward center body 64 may be constructed from a CMC material or another suitable composite material. In this respect, the forward center body 64 may include a plurality of plies 186 (FIG. 3) as will be discussed in greater detail below. Conversely, the turbine rear frame 68 may be constructed from a metallic material such as a nickel-based superalloy. Although, the forward center body 64 and the turbine rear frame 68 may be constructed from any suitable material.

FIG. 3 illustrates the portions of the forward center body 64 and the turbine rear frame 68 coupled by the attachment assembly 100. More specifically, the turbine rear frame 68 defines the turbine rear frame aperture 106, which extends between a first surface 102 and a second surface 104. In a similar manner, the forward center body 64 defines the forward center body aperture 112, which extends between a first surface 108 and a second surface 110 and has a forward center body diameter 218. The forward center body 64 also defines a cavity or depression 114 in the first surface 108 positioned circumferentially around the forward center body aperture 112 for accommodating the insert 120 as will be discussed in greater detail below. An annular boss 116 extends radially outward from the second surface 110 of the forward center body 64 and is positioned circumferentially around the forward center body aperture 112. The forward center body 64 and the turbine rear frame 68 may at least partially overlap and may be axially spaced apart by an axial gap 118. Preferably, the turbine rear frame aperture 106 and forward center body aperture 112 are radially aligned (i.e., concentric), but may be radially offset as well. The turbine rear frame aperture 106 may include a plurality of threads 188.

FIG. 4 illustrates the various components of the attachment assembly 100 as well as the positioning of each with respect to the forward center body 64 and the turbine rear frame 68.

As illustrated in FIGS. 4 and 5, the attachment assembly 100 includes the insert 120 having an insert annular wall 138. The insert annular wall 138 includes an insert annular wall length 172 and extends in the axial direction 90. The insert annular wall 138 defines an insert aperture 150 extending therethrough. In this respect, the insert annular wall 138 includes a radially outer surface 142 and a radially inner surface 144. As such, the insert annular wall 138 includes an inner diameter 202 and an outer diameter 200. Preferably, the entirety of the radially inner surface 144 includes a plurality of threads 190 as illustrated in FIG. 5. Although, only a portion of the radially inner surface 144 may include the plurality of threads 190.

The insert 120 also includes an insert flange 140 extending radially outwardly from the insert annular wall 138. The insert flange 140 includes a first surface 146, a second surface 148, a radially outer surface 192, and an insert flange diameter 170. Preferably, the insert flange diameter 170 is greater than the forward center body aperture diameter 218. For example, the insert flange diameter 170 may be about 1.5 times to 5 times longer than the forward center body aperture diameter 218. Alternately, the insert flange diameter 170 may be about 1.5 times to 3 times longer than the forward center body aperture diameter 218. If the diameter 218 of the forward center body aperture 112 varies in the radial direction 92, the smallest of the forward center body aperture diameters 218 is used to define the insert flange diameter 170. Although, the insert flange diameter 170 may be relatively shorter than or the same as the insert annular wall length 172.

The radially outer surface 192 of the insert flange 140 includes a radially outer radius or fillet 154. The radially outer radius 154 is between 0.05 inches (i.e., 50 mils) and 0.5 inches (i.e., 500 mils); although, the radially outer radius 154 may have any suitable dimensions.

Furthermore, the insert flange 140 includes a radially inner radius or fillet 152 between the insert annular wall 138 and the insert flange 140. Specifically, the radially inner radius 152 is positioned between the radially outer surface 142 and the first surface 146. The radially inner radius 152 is at least 0.05 inches (i.e., 50 mils), but less than the length 172 of the insert annular wall 138. Although, the radially inner radius 152 may have any suitable dimensions.

As illustrated in FIGS. 4 and 6, the attachment assembly 100 also includes the bushing 122. The bushing 122 includes a bushing annular wall 158 and a bushing flange 156 extending radially outward from the bushing annular wall 158. The bushing annular wall 158 defines a bushing aperture 168 extending therethrough. In this respect, the bushing annular wall 158 includes a radially outer surface 164 and a radially inner surface 166. Preferably, the entirety of the radially outer surface 164 includes a plurality of threads 194 as illustrated in FIG. 6. Although, only a portion of the radially outer surface surface 164 may include the plurality of threads 194. The bushing annular wall 158 includes an inner diameter 198 and an outer diameter 196. The outer diameter 196 should be sized to permit the bushing annular wall 158 to fit in the insert aperture 150. The bushing flange 156 includes a first surface 160 and a second surface 162.

The attachment assembly 100 further includes a fastener 124 illustrated in FIG. 4. The fastener 124 may include a head 132 and a shank 204 extending axially outward from the head 132. In one embodiment, the shank 204 includes a smooth portion 208 and a threaded portion 206. Although, the shank 204 may be entirely smooth or threaded. In this respect, the fastener 124 is preferably bolt-like. Nevertheless, any suitable type of fastener may be used.

When the attachment assembly 100 couples the forward center body 64 and the turbine rear frame 68, the insert annular wall 138 is positioned in the forward center body aperture 112 and the insert flange 140 is positioned in the cavity 114. As will be discussed in greater detail below, the cavity 114 is formed by layering the plies 186 over the insert flange 140 and co-curing the plies 186 and the insert 120. In some embodiments, the plies 186 and the insert flange 140 may be co-sintered as well. In certain embodiments, a backer washer 130 may be positioned on the second surface 110 of the forward center body 64 circumferentially around and radially outward from the annular boss 116.

The bushing annular wall 158 is positioned in the insert aperture 150. In this respect, the bushing annular wall 158 and the insert annular wall 138 may be threadingly coupled if the radially outer surface 164 of bushing annular wall 158 includes the threads 194 and the radially inner surface 144 of the insert annular wall 138 includes the threads 190. Although, the bushing annular wall 158 and the insert annular wall 138 may be coupled in any suitable manner (e.g., press-fit, tack-welded, snap-fit, swaged, etc.). As illustrated in FIG. 4, the bushing 122 is oriented such that the bushing flange 156 and the insert flange 140 are positioned on the opposite sides of the forward center body 64.

A spring washer or Belleville spring 126 is positioned between the backer washer 130 and the bushing flange 122. If no backer washer 130 is present, the spring washer 126 is positioned between the bushing flange 156 and the second surface 110 of the forward center body 64. The spring washer 126 exerts axially outward force on the backer washer 130 or the second surface 110 and the bushing flange 156. This force presses the insert flange 140 against the first surface 108 of the forward center body 64 (i.e., the cavity 114), thereby securing the insert 120 and the bushing 122 to the forward center body 64. Alternately, a coil spring (not shown) may exert the aforementioned axially outward force.

The fastener 124 extends through the bushing aperture 168 to couple with the turbine rear frame 68. More specifically, the smooth portion 208 of the shank 204 may be positioned in the bushing aperture 168, and the threaded portion 206 of the shank 204 may couple to the turbine rear frame 68. Alternately, the fastener 124 may threadingly engage the bushing annular wall 158 in some embodiments. In this respect, the fastener 124 is at least partially received by the turbine rear frame aperture 106, the second aperture 112, the insert aperture 150, and the bushing aperture 168. In further alternate embodiments, the smooth portion 208 of the shank 204 may extend through the turbine rear frame aperture 106 and be secured by a nut (not shown) in contact with the first surface 102 of the turbine rear frame 68. After installation, the head 132 of the fastener 124 is preferably axially spaced apart from the first surface 160 of the bushing flange 156 by an axial gap 136 to permit thermal expansion between the various components of the attachment assembly 100.

In the embodiment shown in FIG. 4, the threaded portion 206 threadingly couples with a collar 128, which is positioned in the turbine rear frame aperture 106 and threadingly couples with the turbine rear frame 68. Alternately, the threaded portion 206 may threadingly couple directly to the turbine rear frame 64.

In some embodiments, the attachment assembly 100 may include a leaf seal 134 positioned in the axial gap 118. In this respect, the leaf seal 134 extends between the second surface 104 of the turbine rear frame 68 and the second surface 148 of the insert flange 140. The leaf seal 134 may also contact the first surface 108 of the forward center body 64 instead of or in addition to the second surface 148 of the insert flange 140. Although, some embodiments of the attachment assembly 100 may not include the leaf seal 134.

As mentioned above, the forward center body 64 is preferably constructed from a CMC material or another suitable composite material. For example, the CMC material is preferably an oxide-oxide (e.g., oxide fibers in a silicone matrix) CMC material. Although, a polymeric matrix composite or other suitable composite material may be used. The turbine rear frame 68, the insert 120, the bushing 122, the fastener 124, the spring washer 126, the collar 128, and/or the backer washer 130 are constructed from metallic materials such, including superalloy metals such as nickel-based superalloys, cobalt-based superalloys, etc. Although, the turbine rear frame 68, the insert 120, the bushing 122, the fastener 124, the spring washer 126, the collar 128, and/or the backer washer 130 may be constructed from any suitable material.

Figure 7:
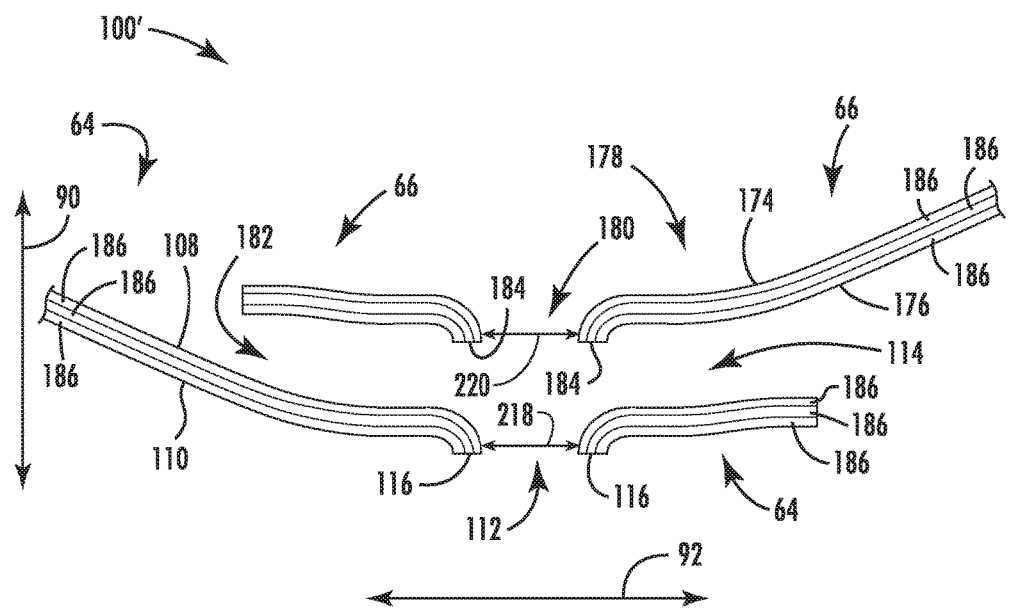
FIG. 7 is a cross-sectional side view of the forward center body and an aft center body, illustrating the alignment of a forward center body aperture and an aft center body aperture for receiving one embodiment of the attachment assembly disclosed herein.
Figure 8:
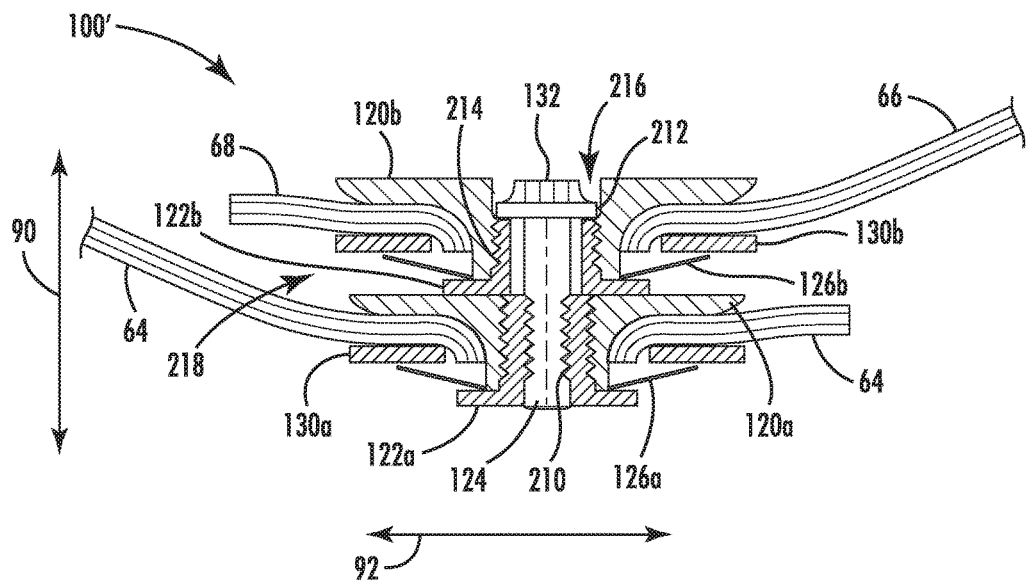
FIG. 8 is a cross-sectional view of one embodiment of the attachment assembly, illustrating a pair of inserts and a pair of bushings.

FIGS. 7 and 8 illustrate an alternate embodiment of the attachment assembly 100'. More specifically, FIG. 7 illustrates the alignment of the forward center body aperture 112 with an aft center body aperture 180, which permits mounting of the attachment assembly 100'. FIG. 8 illustrates the attachment assembly 100' coupling the forward center body 64 and the aft center body 66.

The attachment assembly 100' secures a first component, such as the forward center body 64 of the turbofan 10, to a second component, such as the aft center body 66 of the turbofan 10. Like the attachment assembly 100, the first and second components may be any other adjacent stationary components in the turbofan 10. In some embodiments, the forward center body 64 and the aft center body 66 may be constructed from a CMC material or another suitable composite material. In this respect, the forward center body 64 and the aft center body 66 may include a plurality of plies 186 (FIG. 7) as will be discussed in greater detail below. Although, the forward center body 64 and the aft center body 66 may be constructed from any suitable material.

FIG. 7 illustrates the portions of the forward center body 64 and the aft center body 66 coupled by the attachment assembly 100'. The features of the forward center body 64 are discussed in detail above with respect to FIG. 3. The aft center body 66 defines the aft center body aperture 180, which extends between a first surface 174 and a second surface 176 and has a aft center body diameter 220. The aft center body 66 also defines a cavity or depression 178 in the first surface 174 positioned circumferentially around the aft center body aperture 180 for accommodating an insert 120b as will be discussed in greater detail below. An annular boss 184 extends radially outward from the second surface 176 of the aft center body 66 and is positioned circumferentially around the aft center body aperture 180. The forward center body 64 and the aft center body 66 at least partially overlap and may be axially spaced apart by an axial gap 182. Preferably, the forward center body aperture 112 and the aft center body aperture 180 are axially aligned (i.e., concentric), but the forward center body aperture 112 and the aft center body aperture 180 may be axially offset as well.

As illustrated in FIG. 8, the attachment assembly 100' includes a pair of inserts 120a, 120b; a pair of bushings 122a, 122b; a pair of spring washers 126a, 126b; and a single fastener 124. More specifically, the insert 120a and the spring washer 126a are substantially identical to the insert 120 and the spring washer 126 described above in greater detail. The bushing 122a is substantially identical to the bushing 122, except that the radially inner surface 166 of the bushing annular wall 158 includes a plurality of threads 210, which may threadingly couple to the threaded portion 206 of the fastener 124. The first insert 120a, the first bushing 122a, and the first spring washer 126a couple to the forward center body 64 in the same manner as the insert 120, the bushing 122, the spring washer 126 as discussed in greater detail above. In some embodiments, a first backer washer 130a, which is substantially identical to the backer washer 130, may be positioned between the second surface 110 of the forward center body 64 and the spring washer 126a.

With respect to the aft center body 66, the bushing 122b and the spring washer 126b are substantially identical to the bushing 122 and the spring washer 126 described above in greater detail. The insert 120b is substantially identical to the insert 120, except that the radially inner surface 144 includes a threaded portion 214 having the plurality of threads 190 and a smooth portion 212. Furthermore, the smooth portion 212 defines a cavity 216 positioned circumferentially around the insert aperture 150 to provide clearance for the head 132 of the fastener 124. The second insert 120b, the second bushing 122b, and the second spring washer 126b couple to the aft center body 66 in the same manner as the insert 120, the bushing 122, the spring washer 126 couple to the forward center body 64 as discussed in greater detail above. In some embodiments, a second backer washer 130b, which is substantially identical to the backer washer 130, may be positioned between the second surface 176 of the aft center body 66 and the second spring washer 126b.

The fastener 124 couples the forward center body 64 and the aft center body 66. More specifically, the smooth portion 208 of the shank 204 is positioned in the bushing aperture 168 of the second bushing 122b, and the threaded portion 206 of the shank 204 is positioned in the bushing aperture 168 of the first bushing 122a. As such, the threaded portion 206 of the shank 204 threadingly couples to the inner wall 166 of the first bushing 122a. In this respect, the fastener 124 is received by the forward center body aperture 112; the aft center body aperture 180; the insert apertures 150 of the first and second inserts 120a, 120b; and the bushing apertures 168 of the first and second bushing 122a, 122b. The head 132 of the fastener 124 is positioned in the cavity 216. The first surface 108 of the forward center body 64 and second surface 176 of the aft center body 66 may be axially spaced apart by the axial gap 182 to provide clearance for the second insert 120b, the second bushing 122b, and the second spring washer 126b.

In some embodiments, the turbine rear frame 68, the forward center body 64, and/or and the aft center body 66 may include multiple apertures 106, 112, 180 and/or multiple cavities 114, 178 circumferentially spaced apart from each other. In this respect, the turbine rear frame 68 and the forward center body 64 and/or the forward center body 64 and the aft center body 66 may be coupled with multiple circumferentially spaced apart attachment assemblies 100, 100'.

Figure 9:
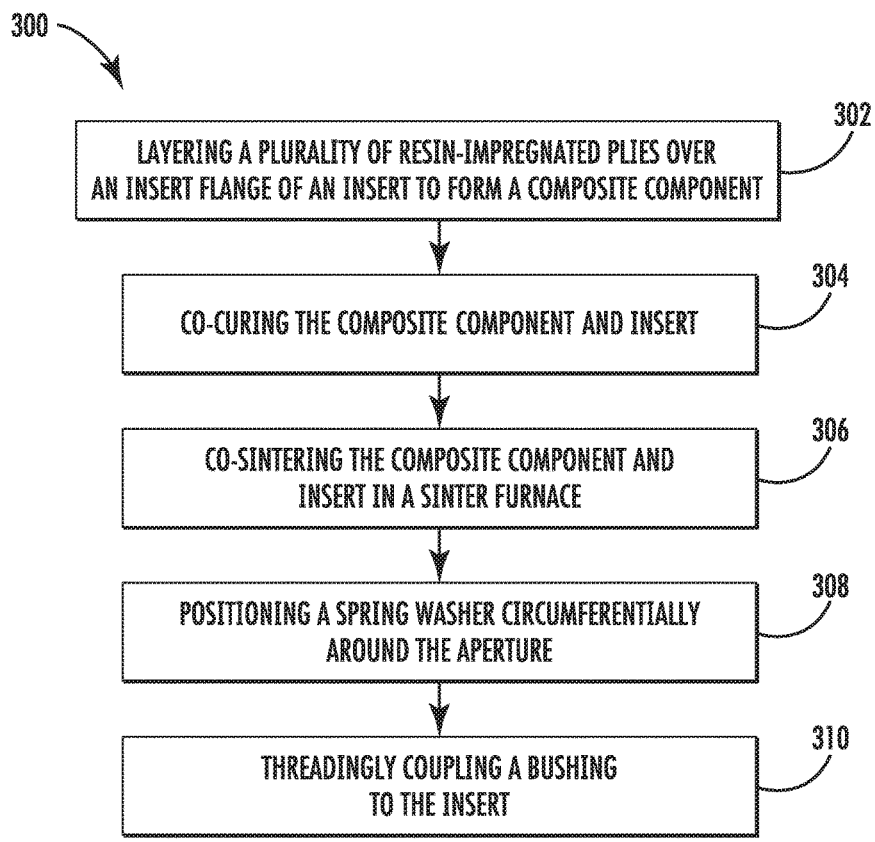
FIG. 9 is a flow chart illustrating a method for forming the attachment assembly in accordance with the embodiments disclosed herein.

FIG. 9 is a flow chart illustrating a method (300) for forming the attachment assembly 100, 100' in accordance with the embodiments disclosed herein. The method (300) is described below in the context of coupling the forward center body 64 to the turbine rear frame 68. Although, the method 300 may be used in the context of coupling the forward center body 64 to the aft center body 66 or, more generally, coupling any composite component in the turbofan 10 to any other component in the turbofan 10.

In step (302), a plurality of resin-impregnated plies, such as the plies 186, are layered over the insert flange 140 of the insert 120 to form a composite component, such as the forward center body 64. As discussed above, the plies 186 are preferably oxide-oxide CMC plies, but may be any type of suitable composite plies. Specifically, a portion of the plurality of plies 186 curves around the radially outer radius 154 and are positioned on the first surface 146 of the insert flange 140. In this respect, the cavity 114 is formed in the forward center body 64 to accommodate the insert flange 140. The insert annular wall 138 extends through the forward center body 64, thereby forming the forward center body aperture 112. That is, the plies 186 do not cover the insert annular wall 138. Instead, the plies 186 curve upwardly when in contact with the radially outer surface 142 of the insert annular wall 138 to form the annular boss 116. As mentioned above, the forward center body 64 may include as many or as few plies 186 as is necessary or desired. In step (304), the plies 186 are initially in the wet state. During the cure process of step (304), the polymeric resins in the wet plies react to yield a composite with a cured matrix. Step (304) may be repeated for a second composite component (e.g., the aft center body 66) if multiple composite components are being coupled by the attachment assembly 100, 100'. Other processes for forming the forward center body 64 (e.g., braiding, filament winding, etc.) may be used as well.

In step (304), the forward center body 64, which is in the wet state, and the insert 120 are co-cured (i.e., cured together and at the same time). Typically, an autoclave is used for the curing in step (304). After step (304), the forward center body 64 is in the green state. In step (306), the forward center body 64 and the insert 120 are placed in a sintering furnace (not shown) and co-sintered (i.e., sintered together and at the same time). Step (306) may be omitted if the forward center body 64 is formed from polymeric matrix composite plies. The steps (304) and (306) effectively couple the forward center body 64 and the insert 120. That is, the insert flange 140 and a portion of the insert annular wall 138 are bonded to the first surface 108 of the forward center body 64. The radially outer fillet 154 prevents cracking of the forward center body 64 when the co-cured and co-sintered with the insert 120 due to the disparate thermal expansion coefficients of the composite forward center body 64 and the metallic insert 120.

Nevertheless, this coupling may not be strong enough for carrying loads exerted on the forward center body 64. In this respect, the bushing 122 and the spring washer 126 may be installed to strengthen this coupling. More specifically, the spring washer 126 is positioned circumferentially around the forward center body aperture 112 and the annular boss 116 in step (308). In step (310), the bushing 122 is threading coupled to the insert 120. As discussed in greater detail above, the spring washer 126 exerts axially outward force on the forward center body 64 and the bushing flange 156, which secures the insert 120 to the forward center body 64. In some embodiments, the backer washer 130 is positioned between the spring washer 126 and the forward center body 64.

Method (300) may include other steps as well. For example, the fastener 124 may be positioned in the bushing aperture 168 to couple the forward center body 64 to a metallic wall, such as the turbine rear frame 68, or another composite wall, such as the aft center body 66.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An attachment assembly for a gas turbine, comprising:
a first component defining a first aperture;
a second component at least partially overlapping the first component, wherein the second component includes a first surface and a second surface and defines a second aperture extending between the first surface and the second surface;
an insert comprising an insert annular wall positioned in the second aperture of the second component and an insert flange extending radially outwardly from the insert annular wall, wherein the insert flange is adjacent to the first surface of the second component, and wherein the insert annular wall defines an insert aperture therethrough;
a bushing comprising a bushing annular wall positioned in the second aperture of the second component and a bushing flange extending radially outwardly from the bushing annular wall, wherein the bushing annular wall defines a bushing aperture therethrough;
a spring washer positioned between the second surface of the second component and the bushing flange; and
a fastener that couples the first component and the second component, wherein the first aperture, the insert aperture, the bushing aperture, and the second aperture receive the fastener, wherein the fastener has a head and a shank extending from the head, and wherein an axial gap is defined between the head and the bushing flange in which no components are positioned.

2. The attachment assembly of claim 1, wherein the first component is a metallic turbine rear frame and the second component is a composite center body.

3. The attachment assembly of claim 1 wherein the first component is a composite forward center body and the second component is a composite aft center body.

4. The attachment assembly of claim 1, wherein a diameter of the insert flange is relatively longer than a length of the insert annular wall.

5. The attachment assembly of claim 1, wherein the bushing directly engages the insert.

6. The attachment assembly of claim 1, further comprising:
a leaf seal positioned between and directly engaging the first component and the insert flange.

7. The attachment assembly of claim 1, further comprising:
a collar positioned in the first aperture of the first component for threadingly engaging the fastener.

8. The attachment assembly of claim 1, further comprising:
a backer washer positioned between and directly engaging the spring washer and the second component.

9. The attachment assembly of claim 1, wherein the bushing, the spring washer, and the fastener are metallic.

10. The attachment assembly of claim 1, wherein the insert annular wall of the insert is threadingly coupled with the bushing annular wall of the bushing.

11. The attachment assembly of claim 1, wherein the insert annular wall has a radial surface and the bushing flange has a first surface and a second surface spaced radially outward of the first surface, and wherein the radial surface of the insert annular wall engages the second surface of the bushing flange.

12. The attachment assembly of claim 11, further comprising:
a backer washer positioned between and directly engaging the spring washer and the second component, and wherein the spring washer directly engages the backer washer and the second surface of the bushing flange.

13. An attachment assembly for a gas turbine, comprising:
a first component defining a first aperture and having a first surface and a second surface radially spaced from the first surface;
a first insert having a first insert annular wall positioned in the first aperture of the first component and a first insert flange extending radially outward from the first insert annular wall, wherein the first insert flange is adjacent to the first surface of the first component, and wherein the first insert annular wall defines a first insert aperture therethrough;
a first bushing having a first bushing annular wall positioned in the first aperture of the first component and a first bushing flange extending radially outward from the first bushing annular wall, wherein the first bushing annular wall defines a first bushing aperture therethrough, and wherein the first bushing flange directly engages the first insert annular wall;
a first spring washer positioned between the second surface of the first component and the first bushing flange;
a second component at least partially overlapping the first component, wherein the second component has a first surface and a second surface and defines a second aperture extending between the first surface of the second component and the second surface of the second component;
a second insert having a second insert annular wall positioned in the second aperture of the second component and a second insert flange extending radially outward from the second insert annular wall, wherein the second insert flange is adjacent to the first surface of the second component, and wherein the second insert annular wall defines a second insert aperture therethrough;
a second bushing having a second bushing annular wall positioned in the second aperture of the second component and a second bushing flange extending radially outward from the second bushing annular wall, wherein the second bushing annular wall defines a second bushing aperture therethrough, and wherein the second bushing flange directly engages the second insert annular wall;
a second spring washer positioned between the second surface of the second component and the second bushing flange; and
a fastener coupling the first component and the second component, wherein the first aperture, the first insert aperture, the first bushing aperture, the second aperture, the second insert aperture, and the second bushing aperture receive the fastener.

14. The attachment assembly of claim 13, wherein the first insert annular wall of the first insert is threadingly coupled with the first bushing annular wall of the first bushing and the second insert annular wall of the second insert is threadingly coupled with the second bushing annular wall of the second bushing.

15. The attachment assembly of claim 13, wherein the second bushing annular wall is threadingly coupled with the fastener.

16. The attachment assembly of claim 13, wherein the first bushing flange of the first bushing has a first surface and a second surface radially spaced from the first surface of the first bushing flange, and wherein the first surface of the first bushing flange directly engages the second insert flange.

17. The attachment assembly of claim 16, wherein the first surface of the first bushing flange directly engages the second bushing annular wall.

18. The attachment assembly of claim 13, wherein the first insert annular wall has a radially inner surface having a threaded portion and a smooth portion positioned axially outward of the threaded portion, wherein the threaded portion of the first insert annular wall threadingly couples the first insert with the first bushing.

19. The attachment assembly of claim 13, wherein the first insert annular flange is positioned radially outward of the first component, the first bushing flange and the second insert annular flange are positioned radially between the first component and the second component, and the second bushing flange is positioned radially inward of the second component.

* * * * *